(12) United States Patent  
Christiansen

(10) Patent No.: US 9,140,823 B2
(45) Date of Patent: Sep. 22, 2015

(54) SYSTEMS AND METHODS FOR USING WIRELESS TAGS WITH DOWNHOLE EQUIPMENT

(75) Inventor: Ted Louis Christiansen, Houston, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 272 days.

(21) Appl. No.: 13/389,025

(22) PCT Filed: Apr. 27, 2011

(86) PCT No.: PCT/US2011/034175
§ 371 (c)(1),
(2), (4) Date: Feb. 6, 2012

(87) PCT Pub. No.: WO2011/139786
PCT Pub. Date: Nov. 10, 2011

(65) Prior Publication Data
US 2012/0133526 A1    May 31, 2012

Related U.S. Application Data

(60) Provisional application No. 61/328,374, filed on Apr. 27, 2010.

(51) Int. Cl.
*G01V 3/00* (2006.01)
*G01V 15/00* (2006.01)
(52) U.S. Cl.
CPC ....................................... *G01V 15/00* (2013.01)
(58) Field of Classification Search
CPC ....................................................... E21B 47/12
USPC ................................. 340/854.6, 854.3, 853.1
See application file for complete search history.

(56) References Cited

U.S. PATENT DOCUMENTS

| 4,285,236 A | | 8/1981 | Chien |
| 4,456,283 A | * | 6/1984 | Forkel Michael et al. ..... 280/804 |
| 4,656,463 A | | 4/1987 | Anders et al. |
| 5,202,680 A | * | 4/1993 | Savage ........................ 340/853.1 |
| 5,324,904 A | | 6/1994 | Cresswell et al. |
| 5,447,207 A | * | 9/1995 | Jones ......................... 175/325.4 |
| 5,576,703 A | | 11/1996 | MacLeod et al. |
| 5,682,099 A | | 10/1997 | Thompson et al. |
| 5,868,201 A | | 2/1999 | Bussear et al. |
| 5,941,307 A | | 8/1999 | Tubel |

(Continued)

FOREIGN PATENT DOCUMENTS

EP    1887181 A1  *  2/2008

OTHER PUBLICATIONS

International Application No. PCT/US2011/034175, Search Report and Written Opinion dated Oct. 27, 2011, 10 pages.

(Continued)

*Primary Examiner* — Amine Benlagsir
(74) *Attorney, Agent, or Firm* — Conley Rose, P.C.

(57) ABSTRACT

Techniques for wirelessly transferring information to and/or from a drill string component are disclosed herein. In one embodiment, a downhole system includes a drill string component and a tag interrogating device. The drill string component includes a tag configured for wireless communication. The tag interrogating device is configured to traverse the interior of the drill string and wirelessly communicate with the tag.

13 Claims, 15 Drawing Sheets

(56) References Cited

U.S. PATENT DOCUMENTS

| | | | |
|---|---|---|---|
| 5,975,204 A | 11/1999 | Tubel | |
| 6,234,257 B1 | 5/2001 | Ciglenec et al. | |
| 6,359,569 B2 * | 3/2002 | Beck et al. | 340/856.3 |
| 6,426,917 B1 | 7/2002 | Tabanou | |
| 6,736,210 B2 | 5/2004 | Hosie et al. | |
| 6,747,569 B2 | 6/2004 | Hill et al. | |
| 6,759,968 B2 * | 7/2004 | Zierolf | 340/854.8 |
| 6,899,178 B2 | 5/2005 | Tubel | |
| 6,923,273 B2 | 8/2005 | Terry et al. | |
| 6,943,697 B2 | 9/2005 | Ciglenec et al. | |
| 7,000,692 B2 | 2/2006 | Hosie et al. | |
| 7,066,284 B2 | 6/2006 | Wylie et al. | |
| 7,098,802 B2 | 8/2006 | Hall et al. | |
| 7,139,218 B2 * | 11/2006 | Hall et al. | 367/82 |
| 7,159,654 B2 | 1/2007 | Ellison et al. | |
| 7,293,715 B2 | 11/2007 | Bargach et al. | |
| 7,423,985 B1 | 9/2008 | Hill | |
| 7,460,438 B2 | 12/2008 | Hudson | |
| 7,557,492 B2 | 7/2009 | Fripp et al. | |
| 7,595,737 B2 | 9/2009 | Fink et al. | |
| 7,715,983 B2 | 5/2010 | Barrus et al. | |
| 7,781,939 B2 | 8/2010 | Fripp et al. | |
| 7,782,205 B1 * | 8/2010 | Gakumura et al. | 340/572.1 |
| 7,866,396 B2 | 1/2011 | Rytlewski | |
| 7,894,301 B2 | 2/2011 | Eperjesi et al. | |
| 7,921,916 B2 | 4/2011 | Lovell et al. | |
| 8,096,354 B2 * | 1/2012 | Poitzsch et al. | 166/250.01 |
| 2004/0020636 A1 | 2/2004 | Kenison et al. | |
| 2004/0020643 A1 | 2/2004 | Thomeer et al. | |
| 2004/0075566 A1 | 4/2004 | Stepanik et al. | |
| 2006/0005965 A1 | 1/2006 | Chouzenoux et al. | |
| 2006/0065401 A1 * | 3/2006 | Allen et al. | 166/345 |
| 2006/0266553 A1 * | 11/2006 | Hutchinson | 175/50 |
| 2006/0272861 A1 * | 12/2006 | Hutchinson | 175/50 |
| 2007/0124220 A1 | 5/2007 | Griggs et al. | |
| 2008/0068209 A1 * | 3/2008 | Sugiyama et al. | 340/853.2 |
| 2008/0311776 A1 * | 12/2008 | Cox et al. | 439/192 |
| 2009/0120637 A1 | 5/2009 | Kirkwood et al. | |
| 2009/0223663 A1 | 9/2009 | Snider et al. | |
| 2009/0223670 A1 | 9/2009 | Snider | |
| 2009/0283258 A1 * | 11/2009 | Poitzsch et al. | 166/250.1 |
| 2010/0013664 A1 * | 1/2010 | Zierolf | 340/854.6 |
| 2010/0065302 A1 * | 3/2010 | Nesbitt | 174/116 |
| 2010/0085190 A1 * | 4/2010 | Sueoka | 340/572.7 |
| 2010/0108380 A1 * | 5/2010 | Teodorescu | 175/24 |
| 2010/0116550 A1 * | 5/2010 | Hutin et al. | 175/40 |
| 2012/0133526 A1 * | 5/2012 | Christiansen | 340/854.6 |

OTHER PUBLICATIONS

"Two-Piece Protective Bulk Roll with Separate Closure", CanusaWrap, [online], [publication date unknown but prior to the date of this application], [retrieved on Nov. 5, 2013], [retreived from www.ccipipe.com/index.php/CanusaWrap], 1 page.

Office Action for Canadian Patent Application No. 2797697 dated Dec. 18, 2013.

* cited by examiner

FIG. 7
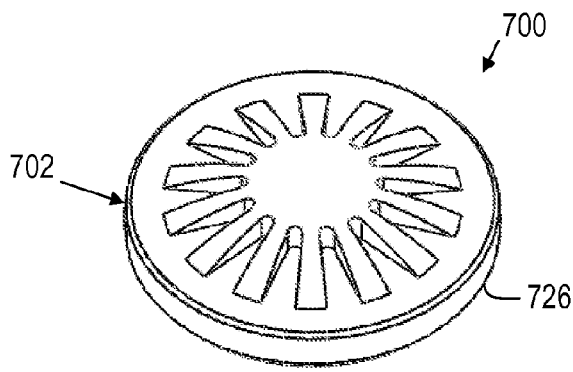
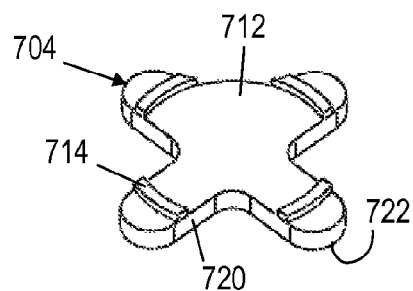
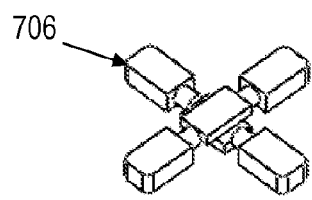
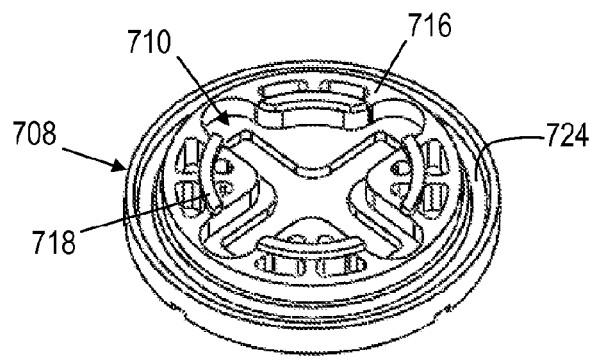

FIG. 8
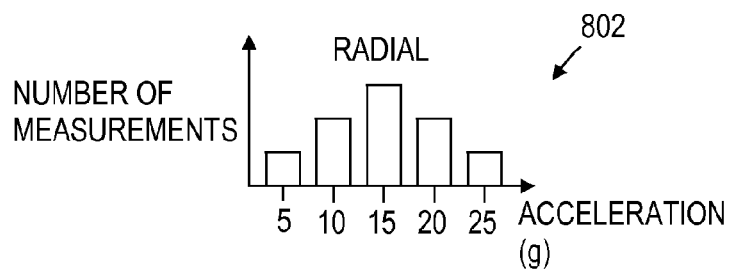
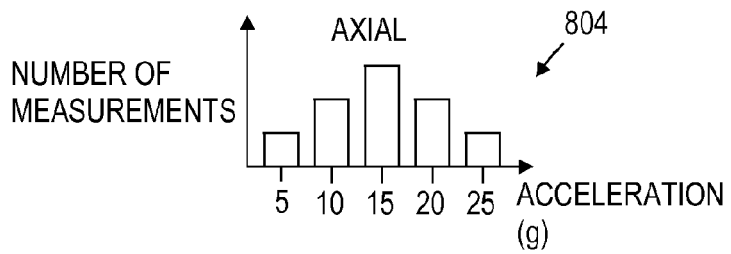
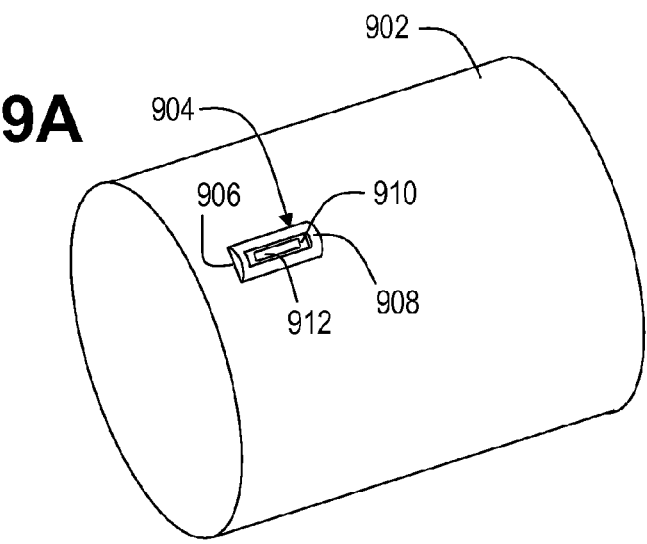
FIG. 9A

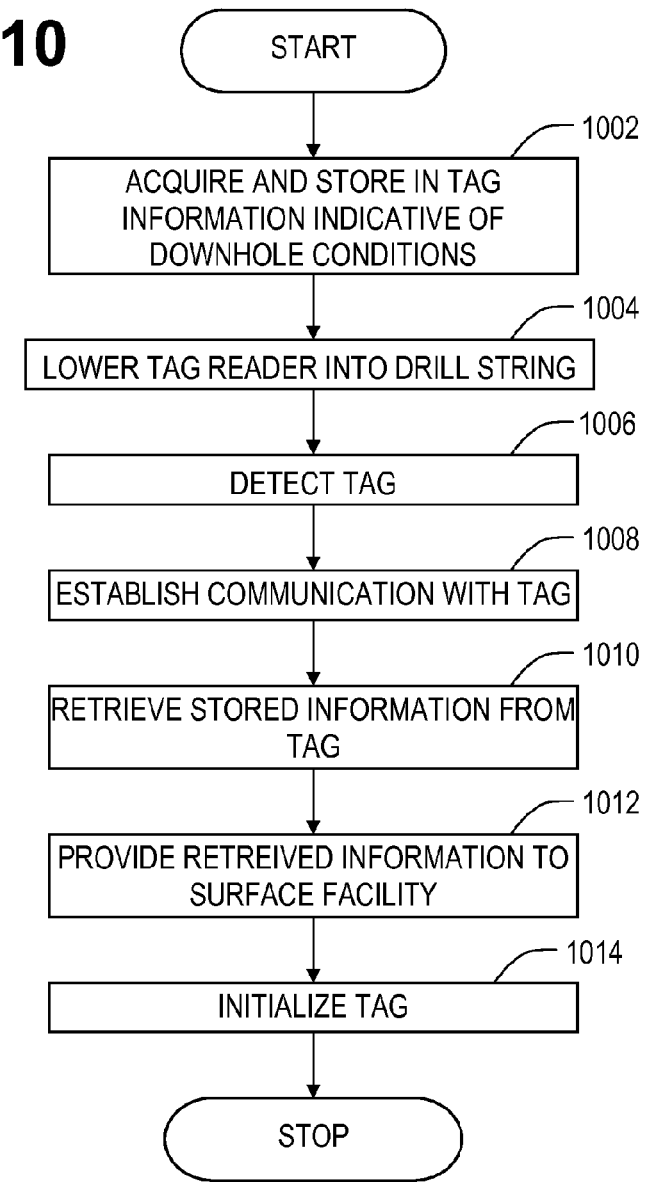

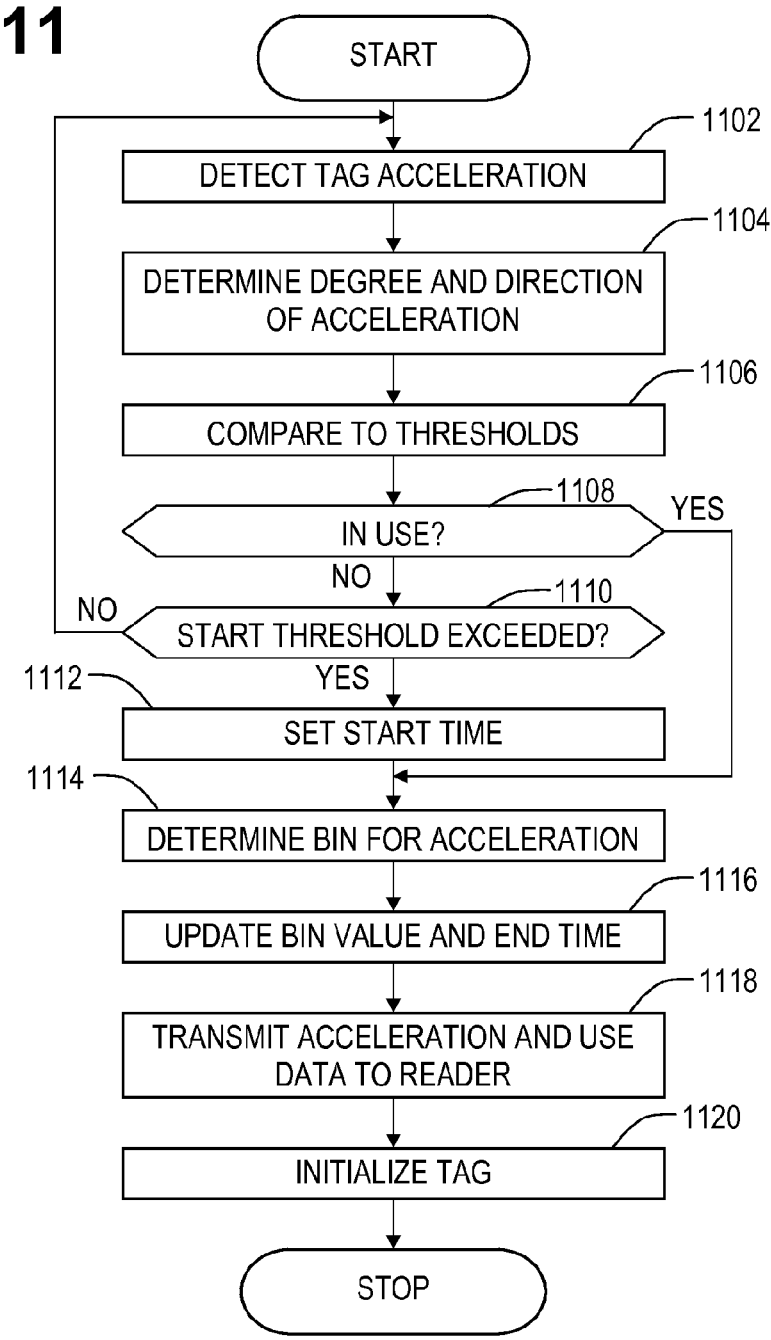

SYSTEMS AND METHODS FOR USING WIRELESS TAGS WITH DOWNHOLE EQUIPMENT

BACKGROUND

Modern oil field operations demand a great quantity of information relating to the parameters and conditions encountered downhole. Such information typically includes borehole environmental information, such as temperature, pressure, etc., and drill string operational information (e.g., stresses encountered by drill string components).

Various methods for acquiring downhole information have been used. For example, measurement instruments may be introduced into the borehole by wireline after extraction of the drill string. Alternatively, the drill string may include measurement tools that transmit downhole information to a surface facility via media incorporated in the drill string or drilling fluid pressure modulation.

BRIEF DESCRIPTION OF THE DRAWINGS

For a detailed description of exemplary embodiments of the invention, reference will now be made to the accompanying drawings in which:

FIG. 7 shows downhole tag packaging in accordance with various embodiments;

FIG. 8 shows a representation of sensor measurements indications recorded by a downhole tag in accordance with various embodiments;

FIG. 9A shows an adapter for attaching a downhole tag to a wellbore tubular in accordance with various embodiments;

FIG. 10 shows a flow diagram for a method for retrieving information from a downhole tag in accordance with various embodiments;

FIG. 11 shows a flow diagram for a method for storing information in a downhole tag in accordance with various embodiments;

NOTATION AND NOMENCLATURE

Certain terms are used throughout the following description and claims to refer to particular system components. As one skilled in the art will appreciate, companies may refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . .". Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Acquisition of borehole information can entail significant expense related to, for example, incorporating measurement tools and telemetry systems in the drill string. Embodiments of the present disclosure include downhole tags affixed to drill string components or other wellbore tubulars to provide an effective and less costly means of measuring wellbore parameters. The downhole tags measure and record downhole information and/or operational information associated with a component incorporating the tag. A tag interrogating device may be passed though the interior of the drill string to extract information recorded by the downhole tags and transfer the extracted information to a surface facility for analysis. Various embodiments of the downhole tag may store measurements as a function of time and/or occurrence-frequency.

Figure 1:
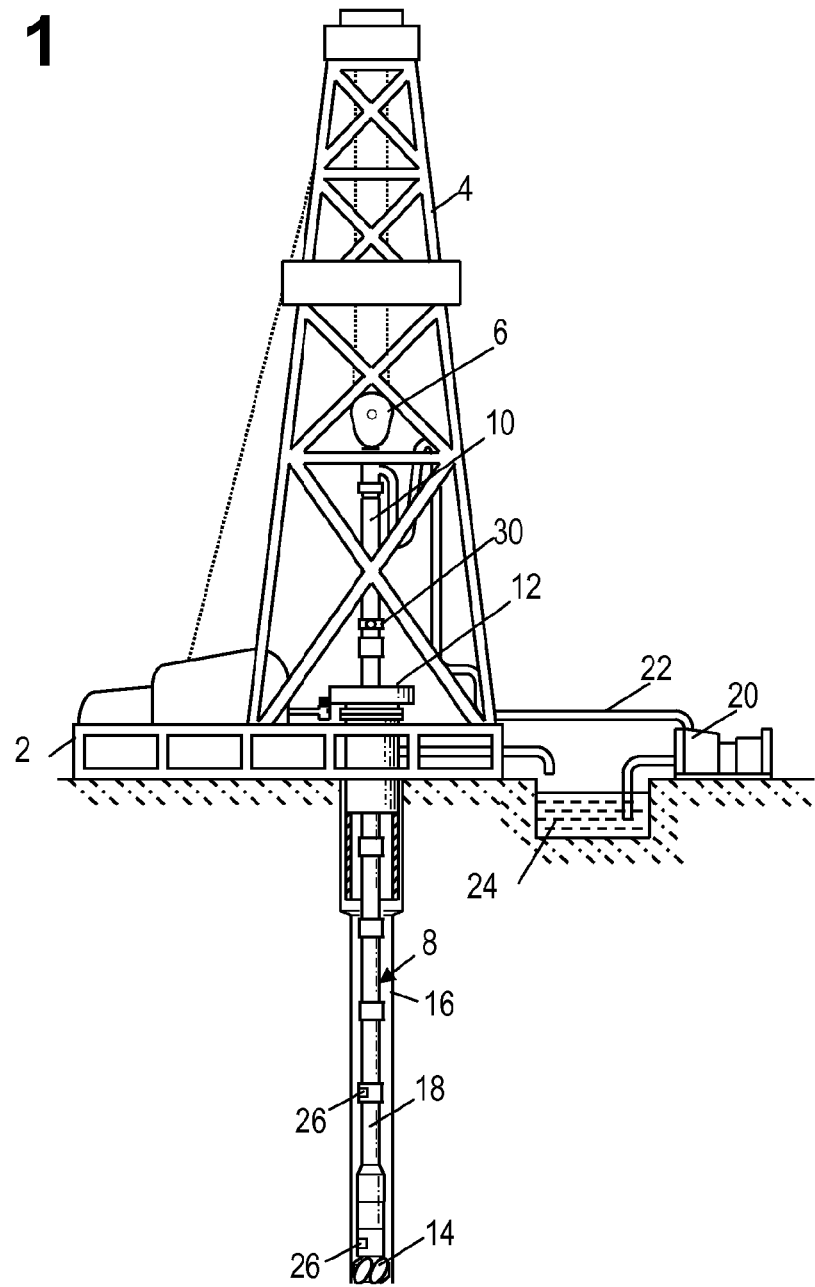
FIG. 1 shows a drilling system including downhole tags in accordance with various embodiments.

FIG. 1 shows a drilling system including downhole tags 26 in accordance with various embodiments. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various subsurface formations. A pump 20 circulates drilling fluid through a feed pipe 22 to kelly 10, downhole through the interior of drill string 8, through orifices in drill bit 14, back to the surface via the annulus around drill string 8, and into a drilling fluid reservoir 24, such as a mud tank or retention pit. The drilling fluid transports cuttings from the borehole into the reservoir 24 and aids in maintaining the borehole integrity.

The drill string 8 is made up of various components, including drill pipe 18 and bottom hole assembly components (e.g., bit 14, mud motor, drill collar, tools, etc.). In embodiments of the present disclosure, some drill string components, for example drill pipe 18, include a downhole tag 26 that measures and records borehole environmental parameters and/or drill string component operational parameters.

Figure 2:
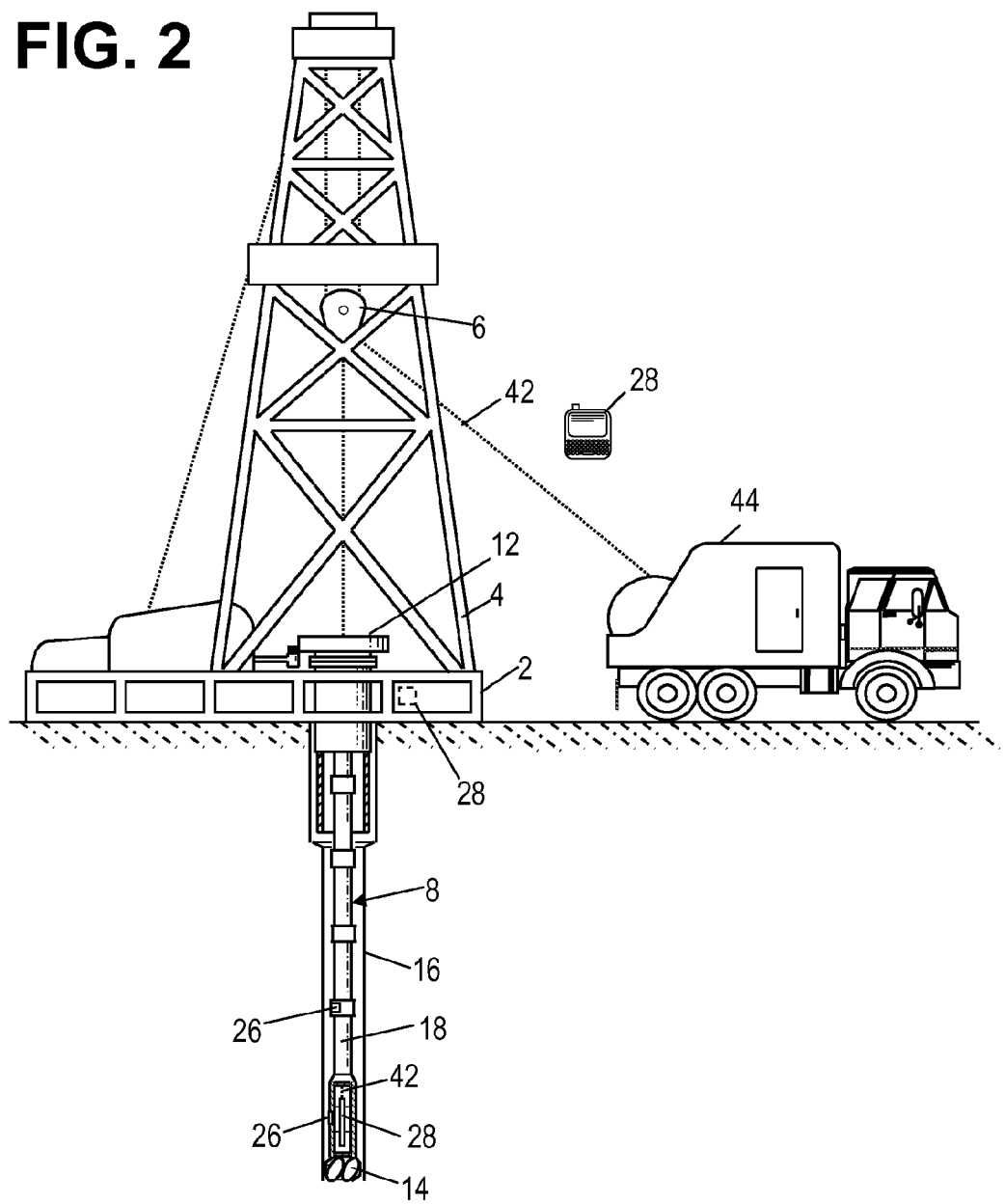
FIG. 2 shows a drilling system including downhole tags and a downhole tag interrogating device in accordance with various embodiments.

FIG. 2 shows a drilling system including downhole tags 26 and a downhole tag interrogating device 28 in accordance with various embodiments. In some embodiments, the downhole tag interrogating device (i.e., the tag reader) 28 is inserted into the interior of the drill string 8. A cable 42, that may include power and/or data conductors for providing power to the tag reader 28 and telemetry between the tag reader 28 and a surface facility 44, allows the tag reader 28 to be lowered through the drill string 8 and returned to the surface. As the tag reader 28 moves into a predetermined proximity of the tag 26 (e.g., within wireless communication range), the tag reader 28 detects the presence of the tag 26, establishes a wireless communication session with the tag 26, and retrieves information collected and stored by the tag 26. Retrieved information may include temperature, pressure, acceleration, and/or other wellbore environmental information.

In some embodiments, the tag reader 28 internally stores information extracted from the tags 26, and the information is provided to the surface facility 44 after the tag reader 28 is withdrawn from the drill string 8. In some embodiments, the tag reader transmits information retrieved from the tags 26 to the surface facility 44 via the cable 42.

Some embodiments of the drilling system include a tag reader 28 located on the drilling platform 2 to retrieve information collected by the tag 26 as the drill string 8 is moved into or out of the borehole 16. In some embodiments, the tag reader 28 is a handheld device.

In some embodiments, the surface facility 44 is local to the drilling platform 2 as shown in FIG. 2. In other embodiments, the surface facility 44 may be a server or other computing device located remotely from the drilling platform 2. In such embodiments, information retrieved from a downhole tag 26 may be transferred to the surface facility 44 via a network (e.g., the Internet, a private wide area network, etc.) for storage and analysis.

Figure 3:
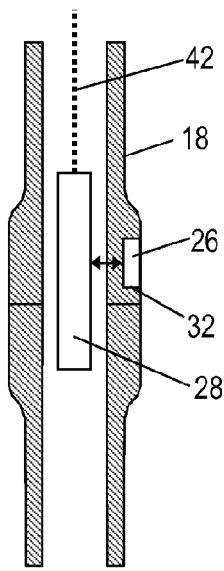
FIG. 3 shows a cross-section of drill pipe including a downhole tag communicating with a downhole tag interrogating device in accordance with various embodiments.

FIG. 3 shows a cross-section of drill pipe 18 including a downhole tag 26 communicating with a downhole tag interrogating device 28 in accordance with various embodiments. In some embodiments, the downhole tag 26 is mounted on an exterior surface of a drill string component to provide the tag 26 with access to the wellbore environment. As shown in FIG. 3, the tag 26 is mounted to an exterior surface of the drill pipe 18. The drill pipe 18 includes a pocket 32 disposed to receive the tag 26. The tag 26 may be affixed to the drill pipe 18 by a snap ring disposed in a groove of the pocket 32, epoxy or other adhesive bonding the tag 26 to the drill pipe 18, or other retaining means.

As the tag reader 28 traverses the interior of the drill pipe 18, the tag reader comes within communication distance of the tag 26. The tag 26 and the tag reader communicate wirelessly through the wall of the drill pipe 18. Wireless communication through the metal wall of the drill pipe 18 is achieved by including long wavelength inductive transceivers in the tag 26 and the tag reader 28. The magnetic waves produced by the transceivers propagate through the metallic wall of the drill pipe 18. As the tag reader 28 comes into communication proximity of the tag 26, the tag 26 and the tag reader 28 detect wireless transmissions from one another, establish a bidirectional wireless communication session, and transfer information stored in the tag 26 to the tag reader 28. The tag reader 28 transmits the transferred information to the surface facility 44, for example via the cable 42.

Figure 4:
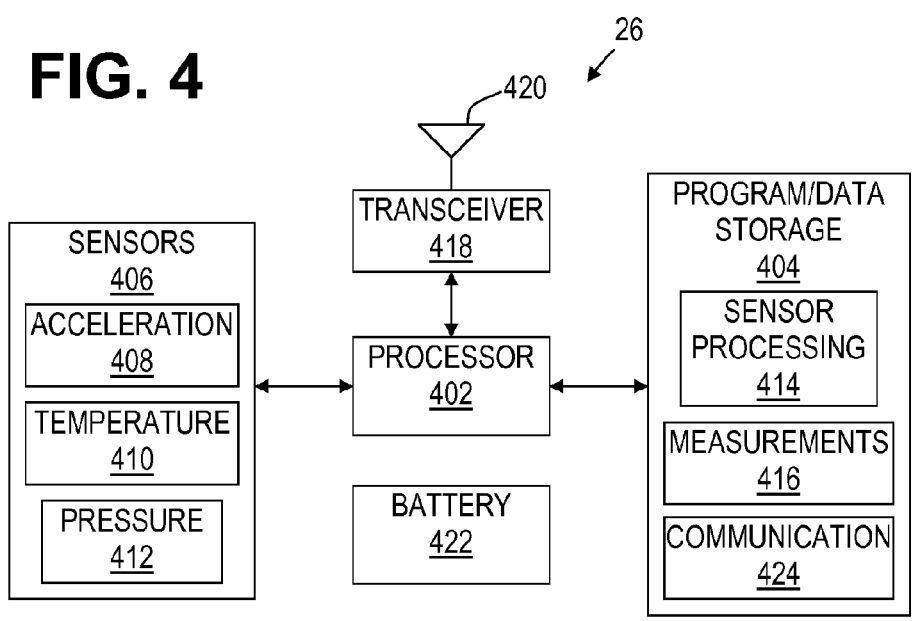
FIG. 4 shows a block diagram of a downhole tag in accordance with various embodiments.

FIG. 4 shows a block diagram of a downhole tag 26 in accordance with various embodiments. An embodiment of the tag 26 includes an antenna 420, a transceiver 418, a processor 402, program/data storage 404, a power source (e.g., a battery 422), and at least some sensors 406. As explained above, the transceiver 418 operates in the long wavelength band (<500 KHz) to wirelessly communicate with the tag reader 28. In some embodiments, the transceiver 418 is configured to operate in accordance with the RuBee, IEEE 1902.1 standard for wireless communication. The antenna 420 converts signals provided to or from the transceiver 418 between conducted and airwave forms.

The processor 402 is configured to execute instructions read from a computer readable medium, and may, for example, be a general-purpose processor, digital signal processor, microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The program/data storage 404 is a computer-readable medium coupled to and accessible to the processor 402. The storage 404 may include volatile and/or non-volatile semiconductor memory (e.g., FLASH memory, static or dynamic random access memory, etc.), or other appropriate storage media now known or later developed. Various programs executable by the processor 402, and data structures manipulatable by the processor 402 may be stored in the storage 404.

Transducers of various types may be included in the sensors 406. A temperature transducer 410, pressure transducer 412, and/or acceleration transducer 408 may be provided. The temperature and pressure transducers 410, 412 may be disposed to measure borehole temperature and pressure. The acceleration transducer 408 may be arranged to detect acceleration of the drill string component to which the tag 26 is affixed. In some embodiments, the acceleration transducer 408 comprises a multi-axis accelerometer or a plurality of accelerometers arranged to detect different directions of tag 26 acceleration.

Signals produced by the sensors 406 are digitized and provided to the processor 402. The processor 406 analyzes the signals in accordance with sensor processing programming 414 provided from the storage 404. For example, an embodiment of sensor processing 414 configures to the processor 402 to periodically store samples provided from each sensor 406 in measurement storage 416.

Communication programming 424 configures the processor 402 to execute the protocols required to communicate with the tag reader 28. Communication programming 416 may also cause the processor 402 to provide the stored transducer measurements 416 to the tag reader 28.

Some embodiments of the downhole tag 26 may include a power system that omits the battery 422. Such embodiments may further omit the sensors 406 and associated processing logic 414. Embodiments lacking the battery 422 may be powered by energy drawn from the magnetic waves generated by the tag reader 28 and detected by the antenna 420. Information (e.g., tag 26 identification information) may be stored in the program/data storage 404 for transmission by the tag 26 when the tag communicates with the tag reader 28.

Figure 5:
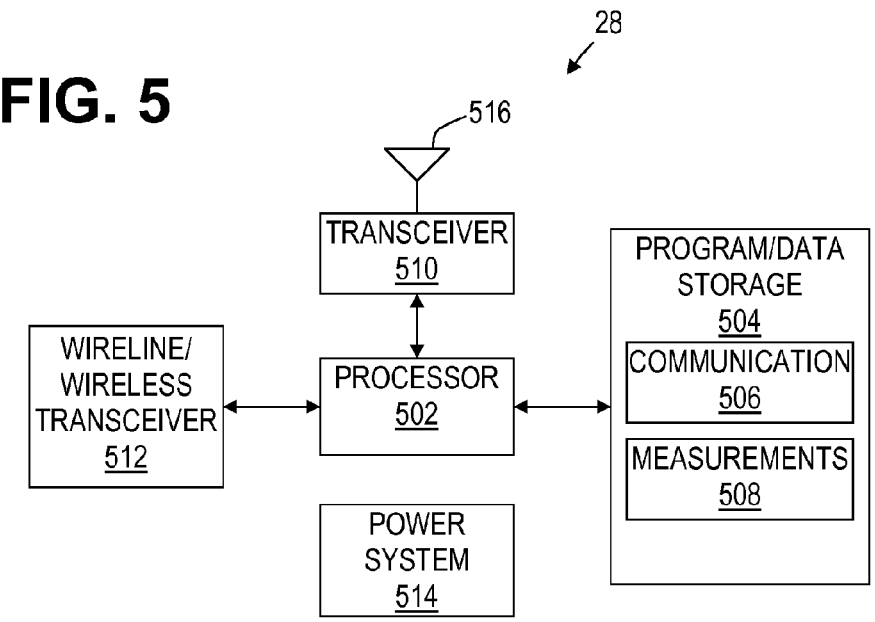
FIG. 5 shows a block diagram of a downhole tag interrogating device in accordance with various embodiments.

FIG. 5 shows a block diagram of a downhole tag interrogating device (tag reader) 28 in accordance with various embodiments. An embodiment of the tag reader 28 includes an antenna 516, a transceiver 510, a processor 502, program/data storage 504, and a power system 514. As explained above the transceiver 510 operates in the long wavelength band (<500 KHz) to wirelessly communicate with the downhole tag 26. The antenna 516 converts signals provided to or from the transceiver 510 between conducted and airwave forms. Some embodiments of the tag reader 28 also include a wireline/wireless transceiver 512 (e.g., Ethernet, IEEE 802.3, IEEE 802.11, Bluetooth, etc.).

The processor 502 is configured to execute instructions read from a computer readable medium, and may, for example, be a general-purpose processor, digital signal processor, microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The program/data storage 504 is a computer-readable medium coupled to and accessible to the processor 502. The storage 504 may include volatile and/or non-volatile semiconductor memory (e.g., FLASH memory, static or dynamic random access memory, etc.), or other appropriate storage media now known or later developed. Various programs executable by the processor 502, and data structures manipulatable by the processor 502 may be stored in the storage 504.

The communication software programming 506 stored in the storage 504 configures the processor 502 to execute the protocols required to detect the presence of the downhole tag 26, establish a communication session with the detected tag 26, and wirelessly retrieve information, including the sensor measurements 416 from the tag 26. In some embodiments, the processor 502 may also be configured to set the downhole tag 26 to an initial state after sensor measurements 416 have been retrieved, thereby configuring the tag 26 to acquire additional measurements.

Sensor measurements 416 and other information (e.g., identification information) retrieved from the downhole tag may be stored in storage 504 as measurements 508. In some embodiments, the communication software programming 506 configures the processor 502 to transmit the measurements 508 and other information to the surface facility 44 via the wireline transceiver 512 and the cable 42. In some embodiments, the measurements 508 include measurements 416 retrieved from all downhole tags 26 detected in the drill string 8. In some embodiments, the communication software programming 506 may configure the processor 502 to transfer the measurements 508 to the surface facility 44 via the wireless transceiver 510 and/or the wireless transceiver 512 after the tag reader 28 has been extracted from the drill string 8. Various embodiments of the reader 28 may be configured for operation in the interior of the drill string as shown in FIG. 3. Other embodiments may be configured for handheld operation and/or for disposal on the drilling platform 2 to read retrieve tag information as the drill string 8 moves into or out of the borehole 16. An embodiment configured for handheld operation may include a display device (e.g., a liquid crystal display, organic light emitting diode display, etc.) and/or an input device (e.g., a keyboard, pointing device, etc.).

The power system 514 may include converters that convert the voltages provided to the tag reader 28 via power conductors of the cable 42 to the voltages needed to power the components of the tag reader 28. In some embodiments, the power system 514 comprises a battery and converters that convert the voltages provided by the battery to the voltages needed to power the components of the tag reader 28.

Figure 6:
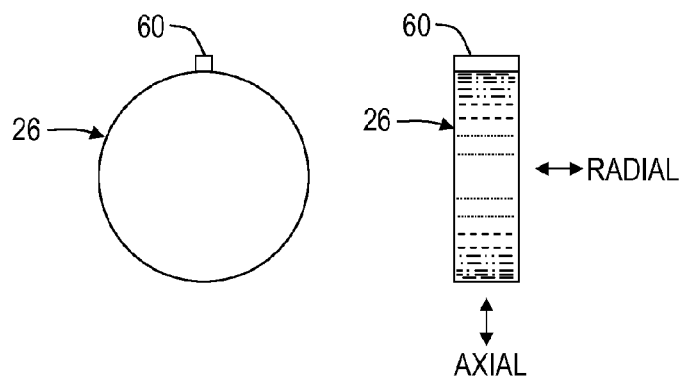
FIG. 6 shows downhole tag packaging in accordance with various embodiments.

FIG. 6 shows downhole tag packaging in accordance with various embodiments. As shown, some embodiments of the downhole tag packaging include an alignment feature (key or orientation key) 60. The alignment feature 60 guides the placement of the tag 60 on a downhole component thereby controlling the orientation of acceleration transducers 408 included in the tag 26 respective to the downhole component. For example, the alignment feature 60 may position the tag 26 on a drill string component such that a first accelerometer is oriented to measure axial (i.e., along the length of component) acceleration, and a second accelerometer is oriented to measure radial (i.e. lateral or rotational) acceleration. The axial acceleration measurement may be indicative of axial vibration and/or movement of the drill string 8 into or out of the borehole, and radial acceleration measurement may be indicative of drill string 8 rotation. In some embodiments, measurements derived from the acceleration transducers 408 are used to log usage or operation of a downhole component. While the exemplary downhole packaging of FIG. 6 is shown as disk shaped, embodiments of the downhole tag packaging may use any of a variety of shapes.

FIG. 7 shows downhole tag packaging 700 in accordance with various embodiments. The package 700 includes a base 708, an inner cover 704, and an outer cover 702. The package 700 may be formed from Polyetheretherketone ("PEEK") or other thermoplastics or materials suitable for use in a downhole environment. The base 708 includes a cavity 710 disposed to contain the antenna 706 (an embodiment of the antenna 420) and electronic components (e.g., transceiver 418, processor 402, storage 404, etc). The inner cover 704 fits into the cavity 710 so that the upper surface 712 of the inner cover 704 and the surface 716 of base 708 are coplanar (i.e., substantially coplanar). The ridges 714 of the inner cover 704 align with the ridges 718 of the base 708 to form a circular protrusion. In some embodiments, the inner cover 704 is bonded to the base 708 by friction welding along the bottom 722 and/or lateral 720 surfaces of the inner cover 704. In some embodiments, other bonding methods are employed (e.g., adhesives).

The outer cover 702 is bonded to the inner cover 704 and the base 708. The rim 726 of the outer cover 702 is configured to be inserted into and bonded to the bottom and/or sidewalls of the groove 724 of the base 708. The outer cover 702 is further configured to allow the upper interior surface of the cover 702 to contact and bond to the circular protrusion formed from the ridges 714, 718 of the inner cover 704 and the base 708. Friction welding (e.g., spin welding) may be used to bond the outer cover 702 to the base 708 and the inner cover 704. Thus, the antenna 706 and electronic components are sealed via the bonded base 708, inner cover 704, and outer cover 702.

In some embodiments, the antenna 706 and electronic circuitry (e.g., a printed circuit board including components 402, 418, 404, etc.) are installed in a cavity in the underside of the inner cover 704, and the cavity is filled with a potting compound (an encapsulating resin, e.g., epoxy, urethane, silicone, etc) that when cured seals and protects the circuitry. Thereafter, the inner cover 704 (including the sealed components) is bonded to the cavity 710 of the base 708. The outer cover 702 is then bonded to the base 702 and the inner cover 704.

In some embodiments, the assembled package 700 is encased in a sealed metallic (e.g., stainless steel) enclosure to prevent migration of water or other fluids into the package 700.

FIG. 8 shows a representation of sensor measurements indications 802, 804 recorded by a downhole tag 26 in accordance with various embodiments. Program/data storage 404 may be limited in some embodiments of the downhole tag 26, thereby restricting storage available for measurements 416. In some embodiments, the sensor processing logic 414 may store a summary of sensor measurements to reduce measurement storage requirements. The measurement summaries may take the form of histograms. The histograms provide a frequency distribution of the acceleration to which the tag 26 is subject.

In FIG. 8, acceleration measurements 804 derived from axial accelerometers 408 and acceleration measurements 802 derived from radial accelerometers 408 are depicted. A number of acceleration ranges are defined, and threshold values are set corresponding the defined ranges. For example, 12.5 g and 17.5 g threshold values may delimit the 15 g radial/axial acceleration range shown in FIG. 8. An axial acceleration value falling between the 12.5 g and 17.5 g threshold values may cause an increase in a measurements 416 stored value indicative of the number of 15 g axial accelerations detected. Threshold values may similarly be set for each defined acceleration range. Such summaries reduce storage requirements while providing substantial information about the tag environment. Embodiments of the tag 26 may provide stored measurement summaries corresponding to any of sensors 406.

Some embodiments of the downhole tag 26 use acceleration measurements to ascertain and log use/operation time of a drill string 8 component. For example, the drill pipe 18 includes the downhole tag 26 comprising multi-axis acceleration sensors 408. The tag 26 may include a time-keeping device (i.e., a clock), acceleration measurement storage (e.g., acceleration summaries 802, 804), and stored indications of the duration of drill pipe 18 use (e.g., time of use indicators, such as use start and end times). When the drill pipe 18 is transferred to a user, time of use indicators in the tag 26, acceleration summaries, etc. may be reset using a device configured to wirelessly communicate with and initialize the tag 26 (e.g., a device similar to the tag reader 28). Thereafter, the tag 26 may periodically compare acceleration measurements provided by the acceleration sensors 408 to use thresholds (e.g., an axial use threshold and a radial use threshold) to determine whether the drill pipe 18 has been put into and/or is continuing service.

When the drill pipe 18 is installed in the drill string 8, and an acceleration measurement exceeds a use threshold, the tag 26 may set a stored use start time (e.g., set a use start time indicator to the current clock time) indicating that the drill pipe 18 is in use. Thereafter, the tag 16 may periodically (e.g. every 60 seconds) compare acceleration measurements to the continuing use thresholds. If the continuing use thresholds are exceeded, the use end time indicator will be updated to the current clock time. Thus, the duration of drill pipe 18 use may be recorded in the tag 26.

As the drill pipe 18 is being used, the tag 26 may also log acceleration measurements. Logged acceleration measurements may take the form of summaries as described above with regard to FIG. 8, and/or acceleration as a function of time. The use time acceleration data may be extracted from the drill pipe 18 and employed to analyze cumulative damage to the drill pipe 18, or to improve future designs.

FIG. 9A shows an adapter 904 for attaching a tag 912 to a wellbore tubular 902 in accordance with various embodiments. The tag 912 may be, for example, a radio frequency identification ("RFID") tag as known in the art, the downhole tag 26, or another identifying/tracking device. The adapter 904 is configured to package the tag 912 and protected the tag 912 from damage. The underside 906 of the adapter 904 is configured for attachment to an exterior surface of the wellbore tubular 902. The tubular 902 may be, for example, a well casing. The underside 906 of the adapter 904 may have substantially the same radius of curvature as the tubular 902 onto which the adapter 904 is to be installed.

Figure 9B:
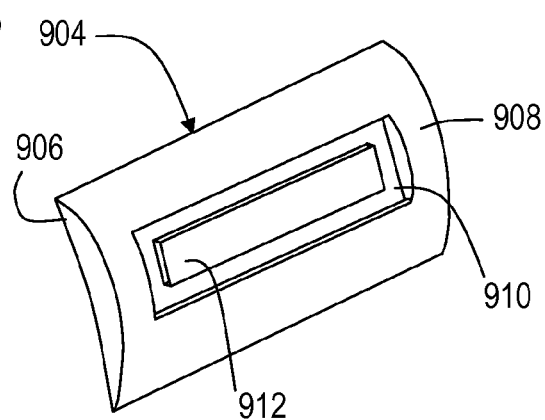
FIG. 9B shows an adapter for attaching a downhole tag to a wellbore tubular in accordance with various embodiments.

The upper side 908 of the adapter 904 has a radius of curvature smaller than that of the underside 906 causing the upper side 908 of the tag 904 to extend outward from the underside 908. A depression or pocket 910 is disposed in the upper side 908 of the adapter 904. The tag 912 is positioned in the pocket 910 and affixed to the adapter 904. Thus, if the tubular 902 is rolled, or impacts another object, the adapter 904 will absorb the impact load and protect the tag 912. FIG. 9B shows a close-up view of the adapter 904.

FIG. 10 shows a flow diagram for a method for retrieving information from a downhole tag 26 in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 10, as well as other operations described herein, can be implemented as instructions stored in a computer readable medium (e.g., storage 404, 504) and executed by one or more processors (e.g., processor 402, 502).

In block 1002, a drill string 8 is present in a borehole 16. At least some components of the drill string 8 include a downhole tag 26 affixed to an exterior surface of the component. As the drill string 8 operates in the borehole 16, the tag 26 acquires information indicative of downhole conditions (e.g., borehole 16 environmental information and drill sting 8 operational information) and stores the acquired information in the tag 26.

In block 1004, in at least some embodiments, the drill string 8 remains in the borehole 16, and the tag reader 28 is lowered into the interior of the drill string 8. The tag 26 and the tag reader 28 include long wavelength inductive transceivers that allow the tag 26 and the tag reader 28 to communicate through the wall of the drill string component to which the tag 26 is affixed. The tag reader 28 is connected to a surface facility 44 by a cable 42, which the surface facility 44 uses to control the traversal of the tag reader 28 through the drill string 8. In some embodiments, the surface facility 44 provides power to the tag reader 28 via power conductors included in the cable 42.

In other embodiments, the tag reader 28 is handheld and manually moved into communication range of a tag 26 outside of the borehole 16. In yet other embodiment, the tag reader 28 is disposed on the drilling platform 2 and tags 26 move into communication range of the reader 28 as the drill string 8 moves into or out of the borehole 16.

In block 1006, as the tag reader 28 moves through the interior of the drill string 8, the tag reader 1006 detects the tag 26. Detection may include identifying the presence of a tag 26 transmission as the tag reader 28 moves to within communication range of the tag 26.

In block 1008, the tag reader 28 establishes communication with the tag 26. In some embodiments, establishing communication includes exchanging addressing and/or protocol information used to direct and transfer information between the tag 26 and the tag reader 28.

In block 1010, the tag reader 28 retrieves the information indicative of downhole conditions stored in the tag 26. The information may include, for example, a log of borehole temperature and/or pressure, and/or stresses experienced by the drill string component to which the tag 26 is affixed. As mentioned above, the tag 26 and the tag reader 28 use long wavelength inductive transmission to communicate through the wall of the drill string 8.

In block 1012, the tag reader 28, provides the retrieved information to a surface facility 44 for analysis. In some embodiments, the tag reader 28 transmits the information to the surface facility 44 via data conductors included in the cable 42. In some embodiments, the information is stored in the tag reader 28 and retrieved by the surface facility 44 after the tag reader 26 is extracted from the tool string 8.

In block 1014, the tag reader 28 has retrieved the information stored in the tag 26 and sends a message to the tag that causes the tag to initialize (e.g., to prepare itself to acquire and store additional information). Initialization may include clearing memory used to store information indicative of downhole information, and/or resetting pointers or indices indicating where newly acquired information is to be stored, and/or setting the tag 26 clock, etc.

FIG. 11 shows a flow diagram for a method for storing information in a downhole tag in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 11, as well as other operations described herein, can be implemented as instructions stored in a computer readable medium (e.g., storage 404) and executed by one or more processors (e.g., processor 402).

In block 1102, a downhole tag 26 is affixed to a component of a drill string 8 and is acquiring data downhole via the sensors 406. More specifically, the tag 26 is acquiring acceleration data from acceleration transducer(s) 408. Acceleration transducers 408 may be configured to measure acceleration along multiple axes of the drill string component. For example, accelerometers 408 may measure axial and radial acceleration of the drill string component to which the tag 26 is affixed. While the following operations are directed to acquiring and storing acceleration information, those skilled in the art will understand that the tag 26 may include other transducers (e.g., temperature 410, pressure 412, etc.) and at least some of the operations depicted are equally applicable to acquiring and storing information from other transducers included in the tag 26.

In block 1104, the tag 26 determines the degree and direction of acceleration detected by the accelerometers 408. Some embodiments of the tag 26 sort and store acceleration data according to the determined degree and direction of detected acceleration.

In block 1106, the tag compares the acceleration data to predetermined thresholds. The thresholds may correspond to degrees of acceleration deemed to indicate that the drill string component has been put into use and/or to various predetermined ranges of acceleration selected for use in summarizing the acceleration measurements. Different thresholds may be established for acceleration in different directions.

In block 1108, the tag 26 determines whether the drill string component to which the tag 26 is affixed is already in use. Such determination may be made by testing a flag or value stored in the tag 26 that is set based on determining that an acceleration measurement compared to a use threshold indicates that the component has transitioned from disuse to use.

If the drill string component is not yet in use, then, in block 1110, the tag 26 determines whether the detected acceleration exceeds the predetermined use start threshold. If the detected acceleration exceeds the start threshold, then the tag 26 sets the stored use start time in block 1112. In some embodiments, setting the use start time includes setting a start time memory location of the tag 26 to a current time maintained by a clock in the tag 26. Setting the start time indicates that the drill string component has been put into use.

If the drill string component is in use, then, in block 1114, the tag 26 determines into which of a plurality of predetermined accelerations ranges or bins, the detected acceleration falls. The bin determination may be based on the threshold comparison of block 1106, wherein threshold values define the bins (e.g., a pair of threshold values define each bin).

In block 1116, a value stored in the tag 26 indicating a number of detected accelerations corresponding to the acceleration range (i.e., the bin) of the detected acceleration is updated (e.g., incremented). In some embodiments, a stored use end time value is also updated. For example, the end time memory value may be set in accordance with a clock maintained in the tag 26. The end time value may be updated based on the detected acceleration exceeding a predetermined continuing use threshold value. The continuing use threshold value may be less than or equal to the threshold value used to determine whether the component has transitioned from disuse to use.

In block 1118, the tag 26 transmits acquired acceleration and/or use and/or other sensor information to a tag reader 28. In some embodiments, the tag reader may traverse the interior of the drill string to wirelessly collect information from the tag 26. In other embodiments, the reader 28 may be disposed on the drilling platform 2 to wirelessly retrieve information from the tag 26 as the drill string 8 is removed from the borehole 8.

In block 1120, the tag 26 is initialized by the reader 28 after the tag 26 has transferred sensor measurements, use information, etc. to the reader 28. Initialization prepares the tag 26 to collect additional information.

Figure 12:
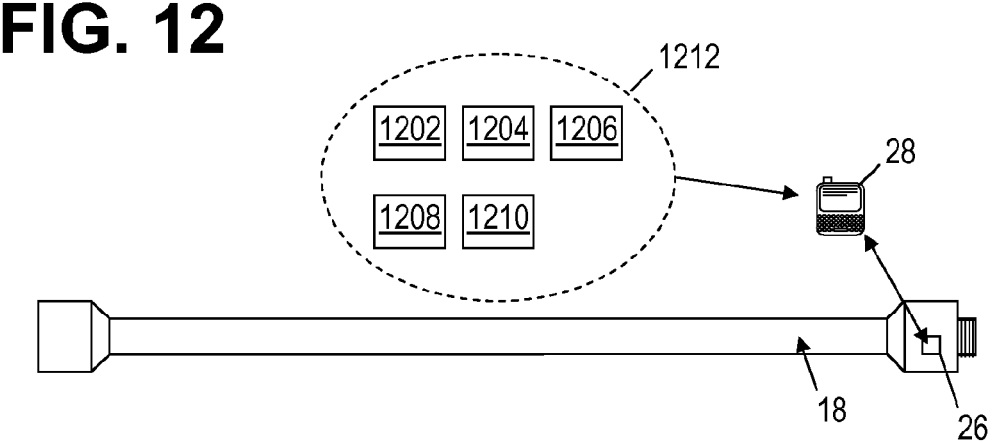
FIG. 12 shows a system for acquiring information related to downhole asset in accordance with various embodiments.

FIG. 12 shows a system for acquiring information related to a downhole asset in accordance with various embodiments. The system includes a downhole asset (e.g., the drill pipe 18), a handheld tag reader 28, and one or more measuring instruments 1212. As explained above, the tag reader 28 is configured to wirelessly retrieve information stored in the tag 26, which may include information related to use of the drill pipe 18, such as use time, rotation time, number of rotations, accelerations, and stresses encountered by the drill pipe 18.

A variety of other instruments 1212 may also be used to gather information related to the physical condition of the drill pipe 18. In some embodiments, such instruments include a wireless transceiver (e.g., an IEEE 802.11, Bluetooth, etc. transceiver) for wirelessly transmitting measurements or other drill pipe physical condition information to the reader 28 or other platform 2 local collection device (e.g., a network access point).

The instruments 1212 may include an inside diameter gauge 1202, thread taper gauge 1204, thread depth gauge 1206, thread stretch gauge 1208, and/or a caliper 1210 for measuring inside and/or outside asset diameter. As explained above, some embodiments of the instruments 1212 wirelessly transmit measurements (e.g., when an operator determines that the measurement is complete) to the reader 28 and/or other destination, thereby improving the speed and accuracy of measurement acquisition.

Embodiments of the tag reader 28 include a wireless transceiver 512 (e.g., an IEEE 802.11, Bluetooth, etc. transceiver) configured to receive measurement information transmitted by the instruments 1212. The tag reader 28 may use the transceiver 512 (or another transceiver included in the reader 28) to transmit asset physical condition information received from the instruments 1212 and tag information retrieved from the tag 26 to a local and/or remote data storage system via, for example, a network access point. In some embodiments, the tag reader 28 stores drill pipe 18 physical measurement information in storage 504 and transmits the information based on instruction of the operator, or automatically (without operator instruction).

Figure 13:
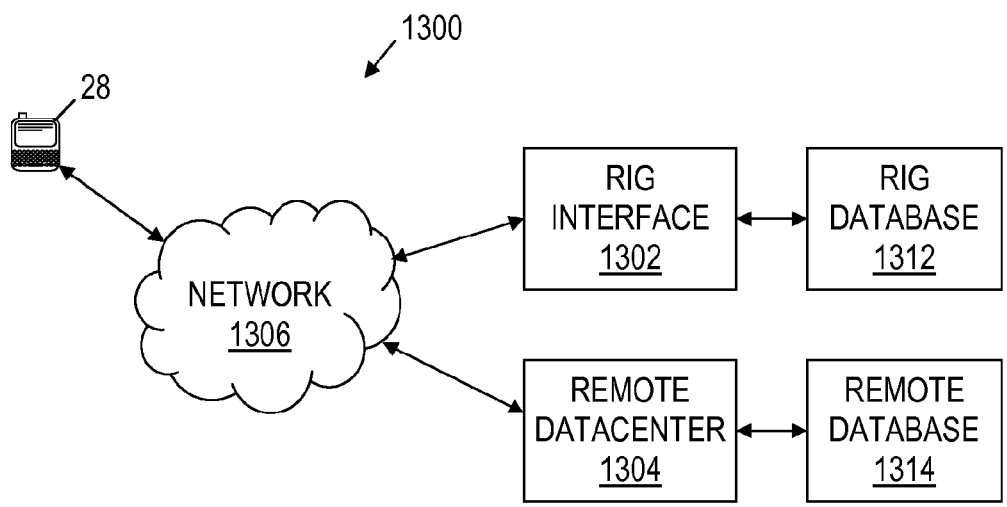
FIG. 13 shows a block diagram of a system for processing information related to a downhole asset in accordance with various embodiments.

FIG. 13 shows a block diagram of a system 1300 for processing information related to a downhole asset in accordance with various embodiments. The system includes a tag reader 28, a network 1306, a rig interface 1302, a remote datacenter 1304, and rig and remote databases 1312, 1314. The tag reader 28 may be, for example, handheld, disposed on the drilling platform 2, or in the interior of the drill string 8. Information related to a downhole asset (i.e., a drill string component), such as the drill pipe 18, is stored in the tag reader 28. The information may include drill string component use and/or borehole information retrieved from a tag 26, and/or drill string component physical information provided from instruments 1212.

The tag reader 28 may transmit the information via the network 1306. The network 1306 may comprise any available computer networking arrangement, for example, any one or a combination of a local area network ("LAN"), a wide area network ("WAN"), a metropolitan area network ("MAN"), the internet, etc., or may comprise a proprietary network. Further, the network 120 may comprise any of a variety of networking technologies, for example, wired, wireless, or optical techniques may be employed. Accordingly, the components of the system 1300 are not restricted to any particular location or proximity to the tag reader 28.

The rig interface 1302 may store, process, and/or display information related to drill string component use and physical parameters provided by the tag reader 28, manual entry, and/or other sources. The rig interface 1302 may store in the rig database 1312 (e.g., a relational or object oriented database) drill string component information received, for example, from the tag reader 28 or the remote datacenter 1304.

The rig interface 1302 may transfer stored asset information to the tag reader 28 and/or the remote data center 1304 via the network 1306. For example, the tag reader 28 (e.g., a handheld tag reader) may retrieve identification information from tag 26 affixed to a drill string component, and provide the identification information to the rig interface 1302. Based on the provided identification information, the rig interface 1302 my transfer stored asset information (e.g., physical parameters, etc.) to the tag reader 28 for storage and/or display.

The remote datacenter 1304 is remote from the platform 2 may store information related to downhole assets, such as drill string components, that are or have been used on numerous different drilling platforms. The remote datacenter 1304 may store such information in the remote database 1314 (e.g., a relational or object oriented database). Thus, the remote datacenter 1304 may store data acquired over the life of a downhole asset for assets used on a plurality of rigs. For example, the remote datacenter 1304 may store asset information for all assets provided from a given manufacturer and/or for which information is received from a rig interface 1302. As explained above, such information may be transferred to the remote datacenter from the rig interface 1302 or other source automatically and without operator intervention. The remote datacenter 1304 may provide a web interface allowing a user to access downhole asset information via a web browser.

The rig interface 1302 and/or the remote datacenter 1304 may process the asset information to determine how the working life of the asset has been affected by the stresses to which the asset has been subjected. Because components of a drill string are subject to different levels and types of stress (e.g., due to weight and/or inclination), effects on each drill string component are individually determined. Based on such determination, the use of the asset (e.g., the position of the asset in drill string 8) may be planned to optimize asset working life.

The rig interface 1302 and the remote datacenter 1304 may be implemented using one or more computers as are known in the art. For example, desktop computers, notebook computers, server computers, etc. may be used. Such computers generally include one or more processors, a display device, and input device, storage device, input/output devices, etc. The databases 1312, 1314 may be databases as known in the art (e.g., relational, object oriented, etc.) local to or remote from the rig interface 1302 or the remote datacenter 1304.

Figure 14:
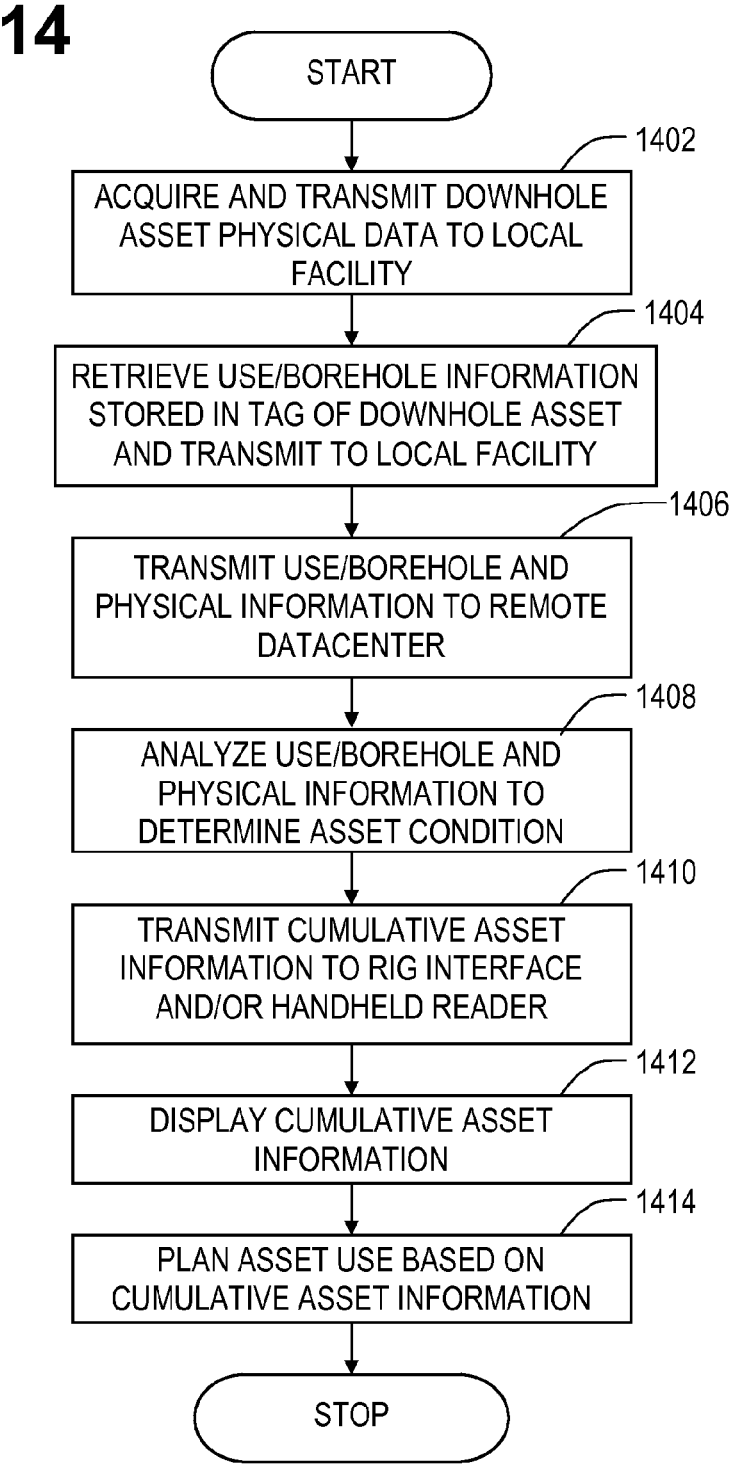
FIG. 14 shows a flow diagram for a method for processing information related to a downhole asset in accordance with various embodiments.

FIG. 14 shows a flow diagram for a method for processing information related to a downhole asset in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 14 can be implemented as one or more computers executing instructions stored in a computer readable medium.

In block 1402, a measuring instrument 1212 acquires and transmits information related to physical parameters of downhole asset (e.g., dimensional information) to a platform 2 local facility, such as the rig interface 1302. The downhole asset may be, for example, a drill pipe 18. In some embodiments, the information is initially transmitted to a tag reader 28, and thereafter transmitted from the tag reader 28 to the local facility. The local facility may store, process, and/or display the information.

In block 1404, a tag reader 28 retrieves use information (e.g., acceleration summaries) and/or borehole information (e.g., temperature, pressure, etc.) from a tag 26 affixed to a downhole asset. The tag reader 28 may be handheld, platform 2 mounted, or within the drill string 8. The tag reader 28 transmits the information to the local facility. The local facility may store, process, and/or display the information.

In block 1406, the local facility may transmit the downhole asset use and physical information, and/or the borehole information to a remote datacenter 1304. The remote datacenter 1304 may include a database for storage of asset information.

In block 1408, the remote datacenter 1304 and/or the local facility may analyze information pertaining a given downhole asset and determine the condition of the asset. The analysis may consider the use information retrieved from the tag 26, such as determined use time, rotational information, inclination information, acceleration information, stresses, pressure and temperature to which the asset has been exposed. The analysis may also consider measurement information, such as changes in asset diameter and/or thread condition.

In block 1410, the remote datacenter 1304 may transmit cumulative information regarding a downhole asset to the rig interface 1302. The rig interface 1302 may transmit cumulative information regarding a downhole asset to a handheld tag reader 28.

In block 1412, cumulative downhole asset information, or a subset of the cumulative information (e.g., information related to a use of a given asset during a prescribed time period) is displayed. Display may be provided, for example, via a web interface executed by a web browser or a handheld tag reader 28 display.

In block 1414, asset use is planned based on the cumulative asset information. By acquiring information specific to each downhole asset, rather than only information general to the drill string 8, stresses unique to each asset can be identified, and using knowledge of the different stresses encountered by each asset the working life of each asset can be maximized.

Figure 15:
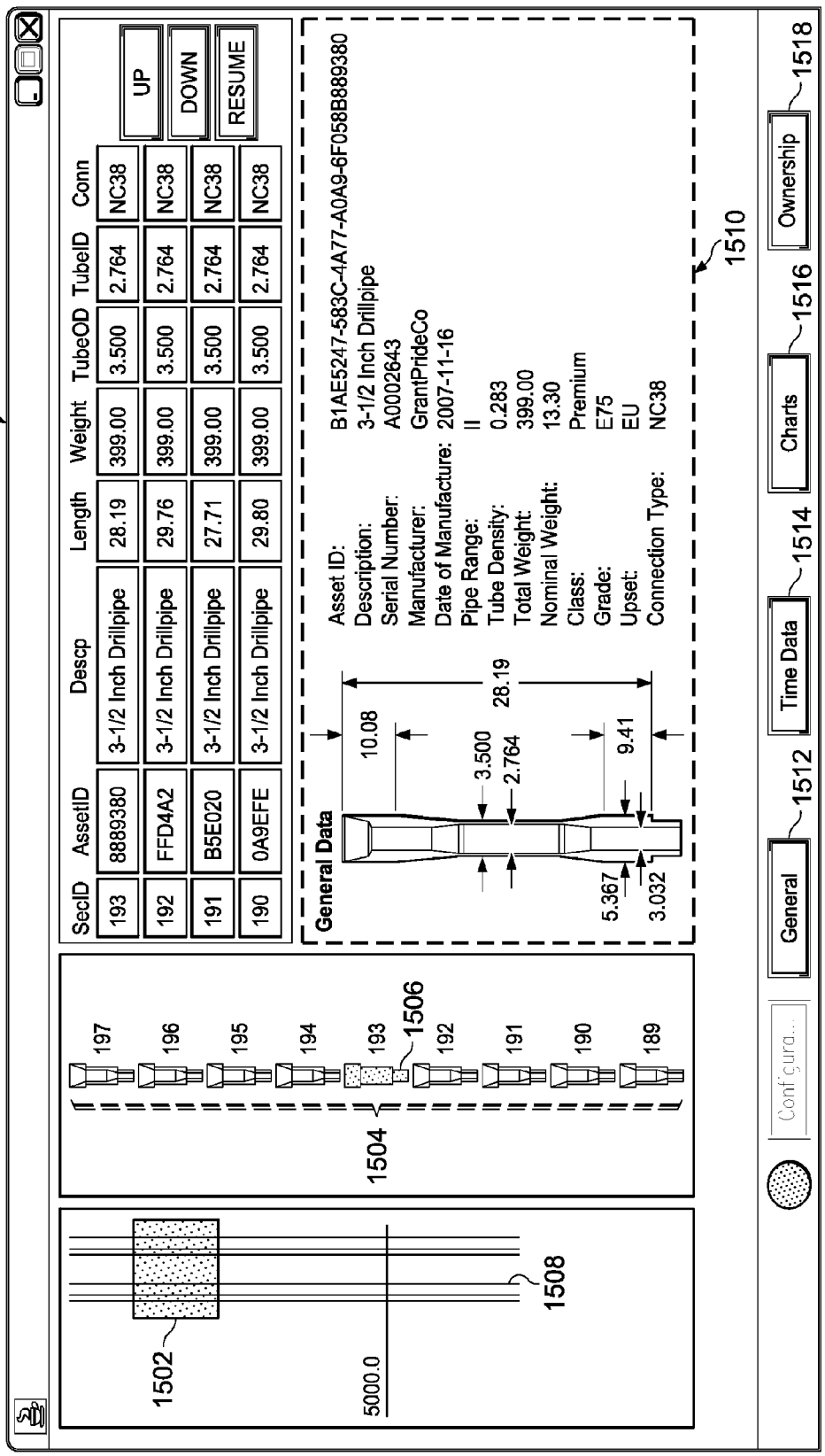
FIG. 15 shows a display of information related to a downhole asset incorporated in a drill string in accordance with various embodiments.

FIG. 15 shows a display 1500 of information related to a downhole asset incorporated in a drill string 8 in accordance with various embodiments. In some embodiments, the rig interface 1302 is configured to provide the display 1500. The display 1500 includes a representation 1508 of the borehole 16 and/or the drill string 8. A portion 1502 of the drill string 8 may be selected for further magnified display 1504. A given component 1506 of the displayed drill string 8 portion 1504 may be yet further selected. Information specific to the selected component 1506 are further displayed 1510.

Buttons 1512-1518 allow an operator to control the type of information provided in display 1510. For example, button 1512 may provide for display of asset dimensional information (measured or specification), button 1514 may provide for display of operation time information for the selected asset 1506, button 1516 may provide for display of charts related to asset 1506 operational parameters (e.g., acceleration, temperature, etc.), and button 1518 may provide for display of asset 1506 ownership information.

Figure 16:
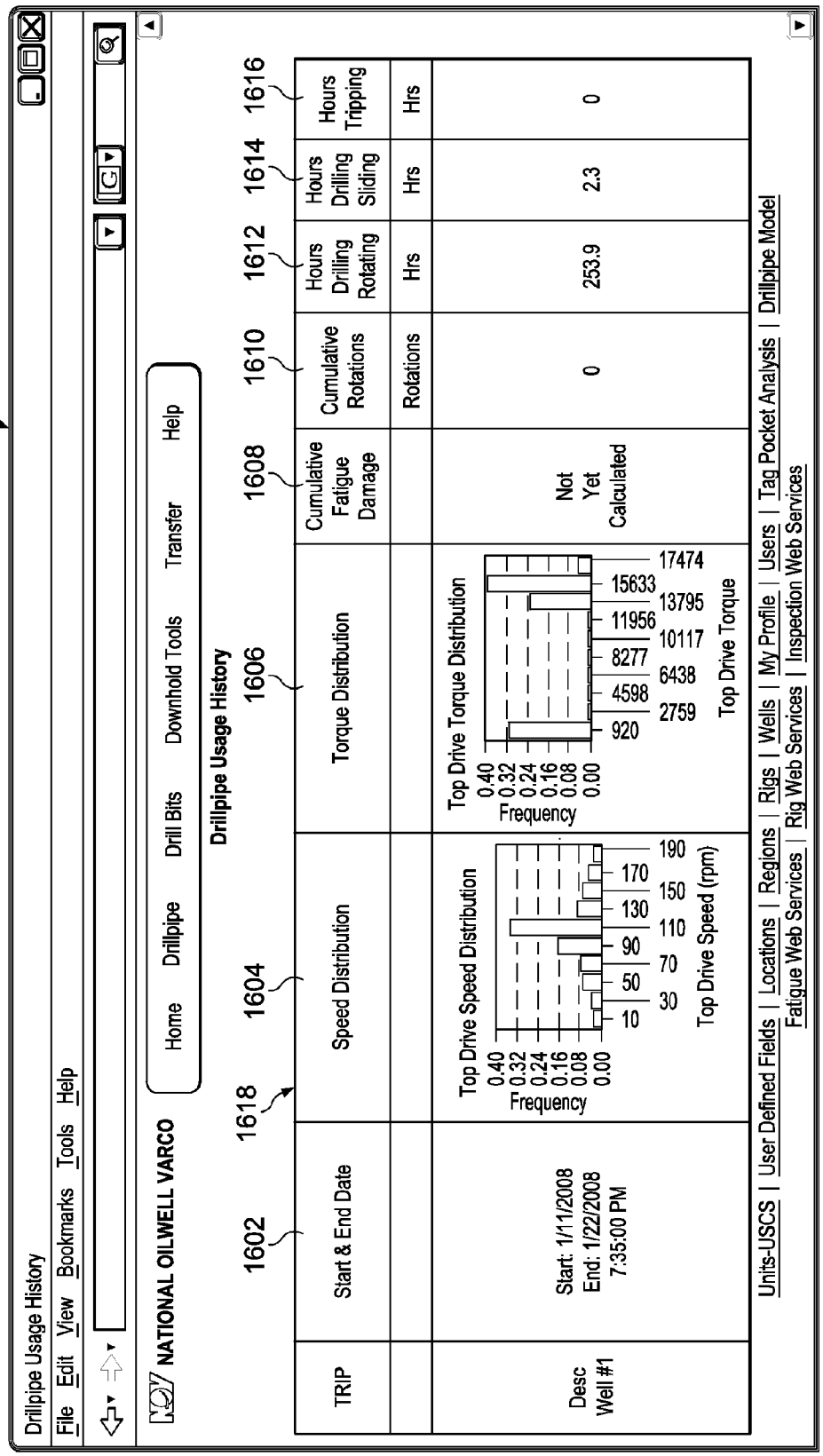
FIG. 16 shows a display of use information for a downhole asset in accordance with various embodiments.

FIG. 16 shows a display 1600 of use information for a downhole asset in accordance with various embodiments. The downhole asset may be a given component of the drill string 8, such as a drill pipe 18. In some embodiments, each row 1618 of the display 1600 is indicative of a single trip. The time period relevant to the display 1600 is shown in field 1602. Distributions of speed and torque experienced by the asset are shown in histogram form in fields 1604 and 1606 respectively.

Cumulative fatigue, displayed in field 1508, may be computed based on trajectory of the asset in the borehole 16, torque and speed applied to the asset, the weight on the drill bit 14, and rate of penetration. At least some of the information used to provide the displays 1604-1608 may be provided from use information retrieved from the tag 26 affixed to the asset.

Cumulative rotations of the asset are displayed in field 1608. Hours drilling rotating for the asset are displayed in field 1612. Hours drilling sliding are displayed in field 1614. Hours tripping for the asset are displayed in field 1616.

Figure 17A:
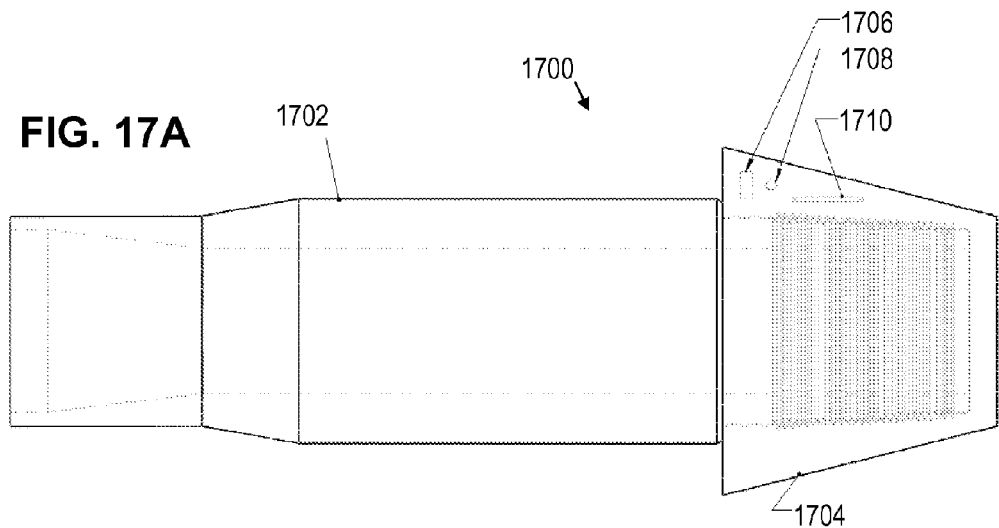
FIG. 17A shows a side view of a downhole tool including a thread protector that measures tool use time in accordance with various embodiments.

FIG. 17A shows further embodiment of a system 1700 for providing usage time information for a downhole tool. The system 1700 includes a downhole tool 1702 and thread protector cap 1704 threadingly coupled to the tool 1702. The downhole tool 1702 may be a drill pipe 18, the drill bit 14, a bottom hole assembly component (e.g., a collar, tool sub, etc.), a component of the drill string 8, or any component incorporating a threadform specified by the American Petroleum Institute. The threads of the aforementioned tools and components are protected from damage by thread protectors, such as the cap 1704, when not in use.

The thread protector cap 1704 includes threads for coupling to the tool 1702, and further includes an antenna 1710, a battery 1708, and tag 1706. The tag 1706 may be the tag 26 described above (see FIG. 4) or equivalent, where the battery 1708 serves as the battery 422 to provide power to the tag 1706, and the sensors 406 include the antenna 1710. The tag 1706 is configured to determine whether the cap 1704 is coupled to the tool 1702. When the tag 26 detects that the cap 1704 is coupled to the tool 1702, the tag 1706 deems the tool not in use. When the tag 26 detects that the cap 1704 is not coupled to the tool 1702, the tag 1706 deems the tool in use and records time values indicative of the time of usage in storage 404. For example, when the tag 1706 detects that the cap 1704 has been removed from the tool 1702, the tag may record a use start time. Thereafter, when the tag 1706 detects that the cap 1704 has been re-installed on the tool 1702, the tag 1706 may record a use end time or use duration value. The tag 1706 may record multiple use interval values as the cap 1704 is removed and reinstalled on the tool 1702 any number of times during a deployment interval. The tag 1706 is configured to wirelessly communicate the recorded use time values to a tag reader 28 as disclosed herein. The usage time values may be transferred from the tag reader 28 to a system (e.g., a database) that monitors tool use.

The antenna 1710 may be a loop antenna that together with other components of the tag 1706 (oscillators, filters, amplifiers, frequency detectors, etc.) forms a proximity detector. The proximity detector is configured to detect metal (e.g., the threadform of the tool 1702) disposed near the antenna 1710. The tag 1706 is configured to identify the proximity of the tool 1702 via a detection signature included in the tag 1706. For example, the proximity detector of the tag 1706 may produce a frequency within a predetermined range when the cap 1704 is threaded onto the tool 1702, and the tag 1706 may be configured to detect oscillation within that range, thereby detecting whether the cap 1704 is threaded onto the tool 1702.

Figure 17B:
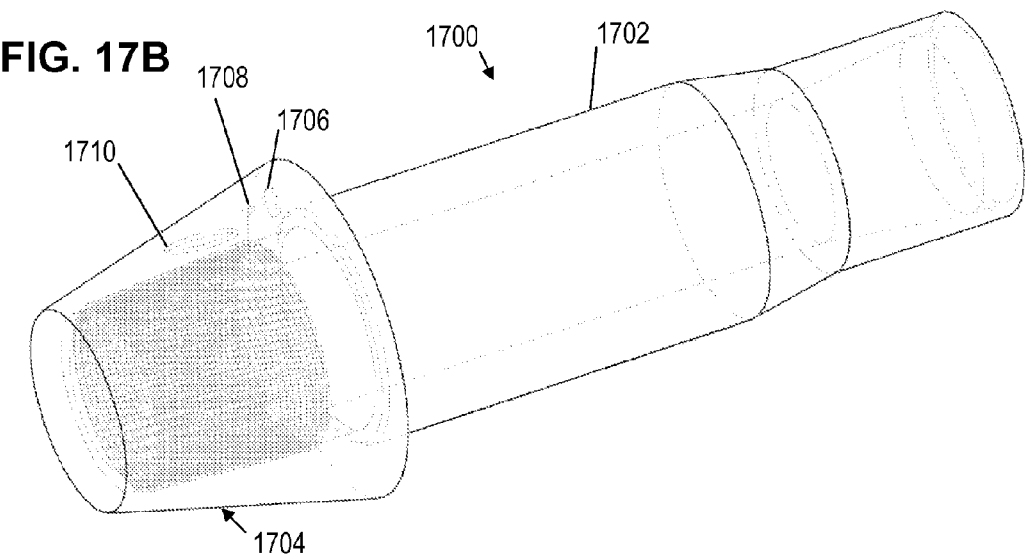
FIG. 17B shows a perspective view of the downhole tool and thread protector of FIG. 17A.
Figure 17C:
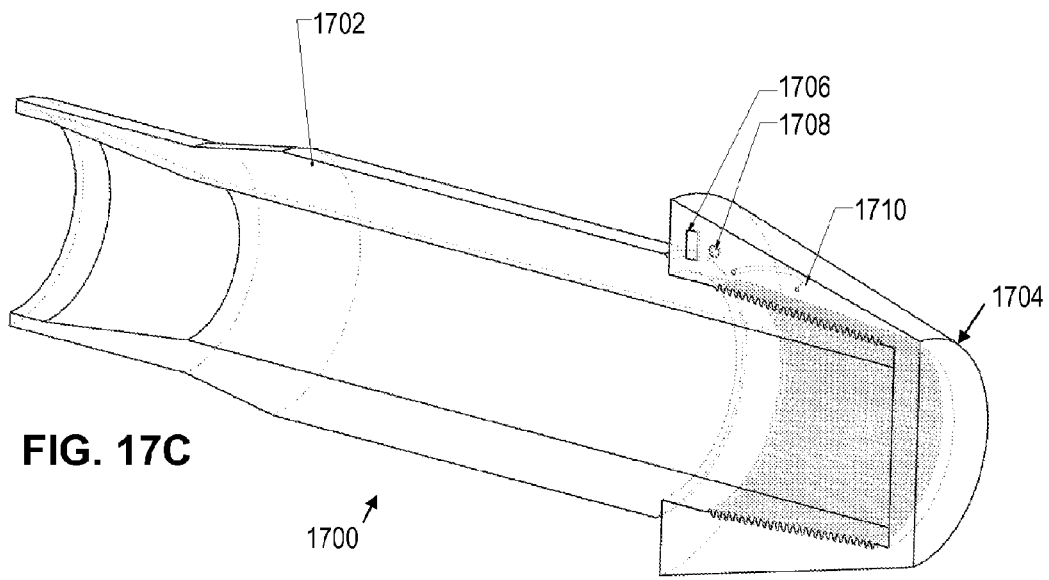
FIG. 17C shows a perspective cross-sectional view of the downhole tool and thread protector of FIG. 17A.

FIG. 17A-C show an embodiment of the cap 1704 configured to couple to the threads of a pin end of the tool 1702. Other embodiments of the cap 1704 are configured to couple to the threads of the box end of the tool 1702.

In an exemplary method of tracking tool use, the cap 1704 is threadingly coupled to the tool 1702 at a facility from which the tool 1702 is distributed (e.g., a tool rental facility). Before the tool leaves the facility to be used, any usage time values stored in the tag 1706 are cleared. The tag reader 28 may be used to clear the usage time values by commands wirelessly transmitted from the tag reader 28 to the tag 1706. As the tool is used in the field, the tag 1706 records tool usage time based on detection of cap 1704 removal and reattachment to the tool 1702 as explained above. When the cap 1704, along with the tool 1702, is returned to the facility, the tag reader 28 wirelessly extracts the stored usage time values from the tag 1706. The extracted values may be stored in tool usage tracking system that, for example, monitors tool life in terms of time used.

The above discussion is meant to be illustrative of various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a tag, comprising:
  a set of accelerometers configured to detect acceleration of the tag along multiple axes;
  a processor to process acceleration measurements provided by the set of accelerometers, wherein processing by the processor comprises: sorting the acceleration measurements according to direction and degree of acceleration detected by the set of accelerometers, setting a use start time based on the acceleration detected exceeding a predetermined threshold after initialization of the tag; and setting a use end time based on the acceleration detected exceeding the predetermined threshold and the use start time being set;

a memory to store results of the processing of the processor; and a transceiver configured for wireless communication; wherein the tag is configured for attachment to an exterior surface of a drill string;

wherein the use start time specifies a time at which a downhole component to which the tag is attached is put into a service, and the use end time specifies a time at which the downhole component to which the tag is attached is no longer in the service;

wherein the transceiver is configured to transfer the acceleration measurements via a communication link including long wavelength inductive transmission to a facility that analyzes operation of the downhole component.

2. The system of claim 1, further comprising a drill string component configured for attachment of the tag to an exterior surface of the drill string component.

3. The downhole system of claim 2, further comprising a thread protector cap threadedly coupleable to the drill string component, the tag positionable in the thread protector cap.

4. The system of claim 1, wherein the tag further comprises an alignment feature that indicates an operational orientation of the tag on a drill string component.

5. The system of claim 1, wherein the processor is to compare the acceleration measurements to a plurality of threshold values at predetermined intervals, and to sort the acceleration measurements in accordance with the plurality of threshold values.

6. The system of claim 5, wherein the processor is to increment a stored acceleration value representing an acceleration range between two threshold values of the plurality of threshold values based on a comparison by the processor identifying one of the acceleration measurements between the two threshold values.

7. The system of claim 1, wherein the transceiver is configured for bidirectional operation in a long wavelength band.

8. The downhole system of claim 1, wherein the downhole component is a downhole drilling tubular.

9. The downhole system of claim 1, wherein the processor is to set the use end time based on the detected acceleration not exceeding a continuing use threshold.

10. A method, comprising:
detecting acceleration of a tag comprising an accelerometer affixed to an exterior surface of a drill string component;
determining degree and direction of the detected acceleration of the tag;
determining which acceleration range of a plurality of predetermined acceleration ranges the detected acceleration falls within;
updating an indication of acceleration measurements detected within the determined acceleration range of the plurality of predetermined acceleration ranges; and
determining a duration of use by identifying a time at which the drill string component is placed into service as being a time at which the detected acceleration exceeded a predetermined start time threshold and identifying a time at which the drill string component is removed from the service as being a time at which the detected acceleration last exceeded a predetermined end time threshold;
transferring the indication of acceleration measurements via a communication link including long wavelength inductive transmission to a facility that analyzes operation of the drill string component.

11. The method of claim 10, further comprising updating an indication of the acceleration measurements detected within the determined acceleration range for each direction of the acceleration measurements.

12. The method of claim 10, further comprising periodically comparing the detected acceleration to a continuing use threshold.

13. The method of claim 10, further comprising determining cumulative fatigue based at least in part on the acceleration measurements from the tag.

* * * * *